United States Patent [19]

Geiger

[11] Patent Number: 4,482,904
[45] Date of Patent: Nov. 13, 1984

[54] COMBINATION RECORDER PEN AND CLIP THEREFOR

[75] Inventor: Carl Geiger, Medford, N.J.

[73] Assignee: DIA-Nielsen USA, Inc., Cinnaminson, N.J.

[21] Appl. No.: 418,638

[22] Filed: Sep. 16, 1982

[51] Int. Cl.³ ............................................. G01D 15/16
[52] U.S. Cl. ................................. 346/140 A; D19/41
[58] Field of Search ....................... 346/140 A, 140 R; D19/41

[56] References Cited

U.S. PATENT DOCUMENTS

| | | | |
|---|---|---|---|
| D. 246,722 | 12/1977 | Raahauge | D19/41 |
| 3,934,255 | 1/1976 | Taylor | 346/140 A |
| 3,983,569 | 9/1976 | Hubbard et al. | 346/140 A |
| 4,023,186 | 5/1977 | Tallerico | 346/140 A |
| 4,052,713 | 10/1977 | Lytle et al. | 346/140 A |
| 4,129,376 | 12/1978 | Hubbard | 346/140 A |
| 4,186,405 | 1/1980 | Pelensky et al. | 346/140 A |
| 4,233,609 | 11/1980 | Hubbard | 346/140 A |

OTHER PUBLICATIONS

Graphic Controls Corporation 1979/1980 Catalog entitled "Marking System Products", pp. 8, 9, 11, 14, 16, 18, 35, 38, 50, 57, 62 & 64.

Dia-Nielsen USA Inc. Catalog entitled "Marking Systems Catalog", pages starting with the headings Decca, Honeywell, Philips/Withof.

Primary Examiner—Joseph W. Hartary
Attorney, Agent, or Firm—Karl L. Spivak

[57] ABSTRACT

A combination recorder pen and recorder pen clip is disclosed having interfitting features to facilitate easy assembly and procedure. The marker pen includes a cartridge which is provided with a pair of longitudinally extending bottom ridges, a pair of longitudinally extending side ledges and a pair of forward, downwardly extending projections. The clip includes a flat body within which is punched a pair of longitudinally extending slots of size and position to receive the ridges therein. The clip terminates forwardly in a nose which is designed to stop against the downwardly extending projections. Side flanges extend from the flat body of the clip for frictional engagement with the cartridge sidewalls over the side ledges. In a preferred embodiment, the ridges and ledges include sloping ramps to facilitate sliding engagement of the clip and the cartridge.

14 Claims, 7 Drawing Figures

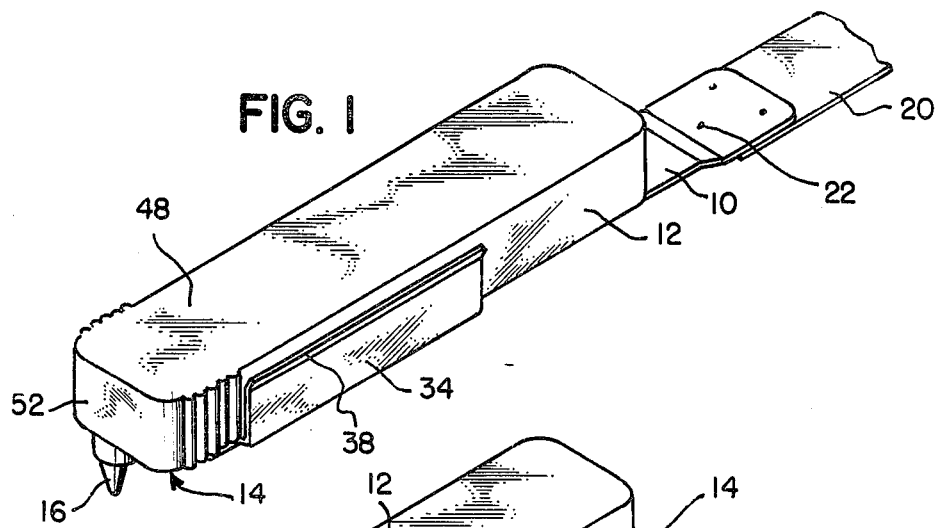
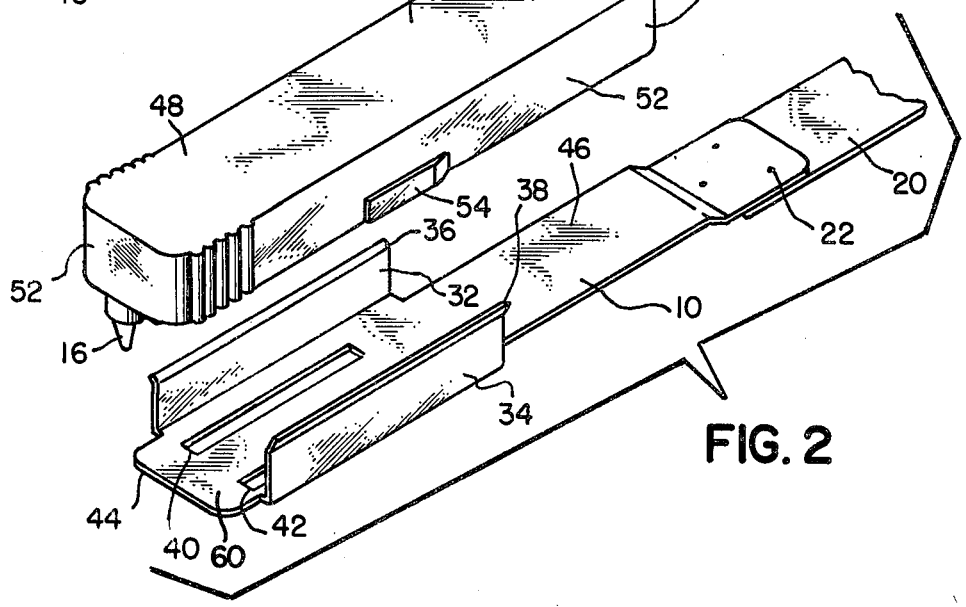
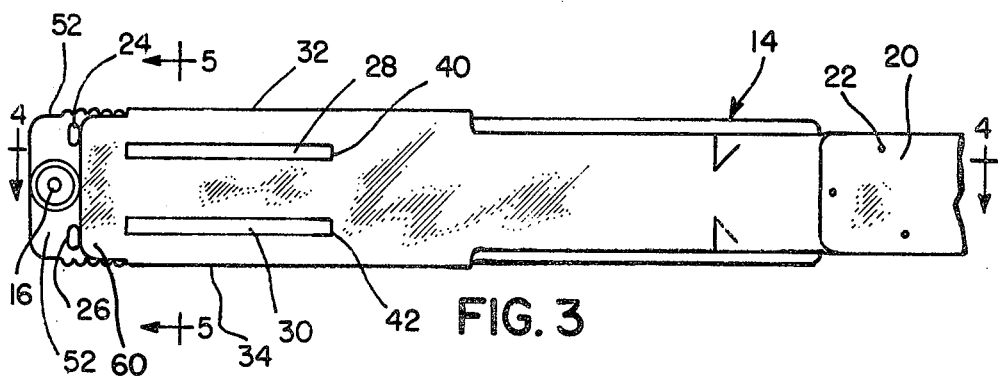

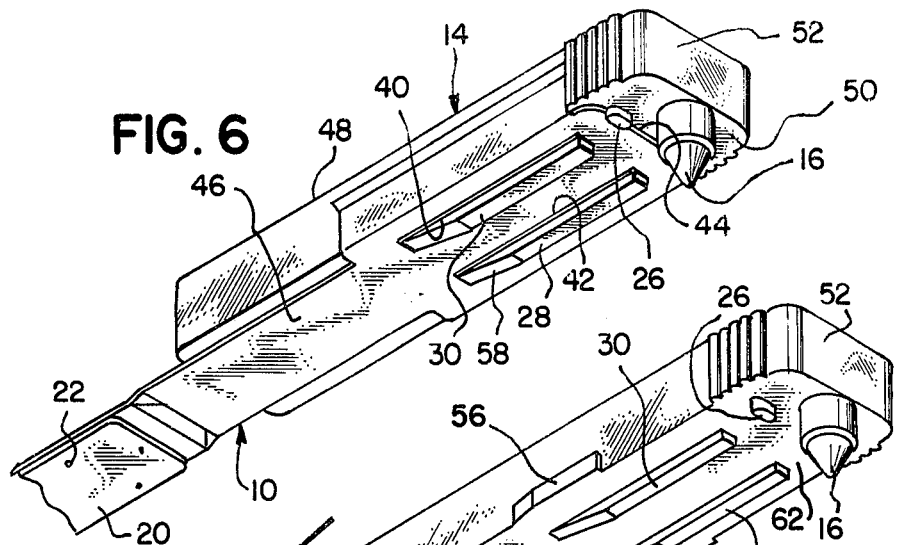
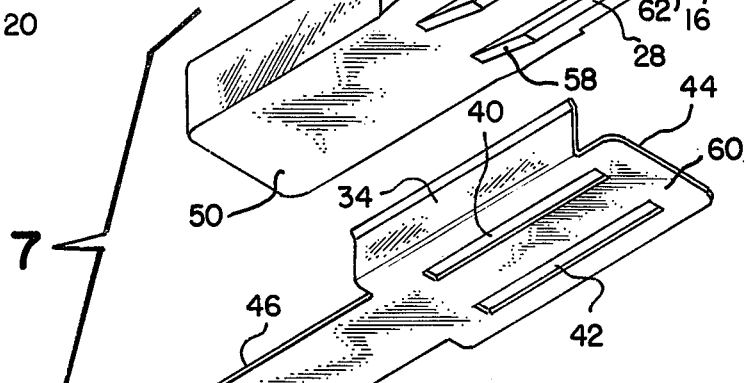
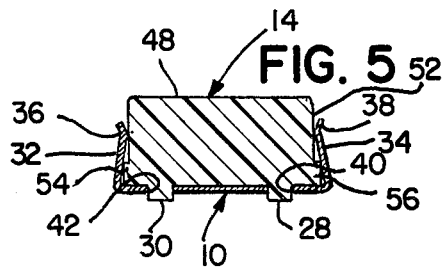
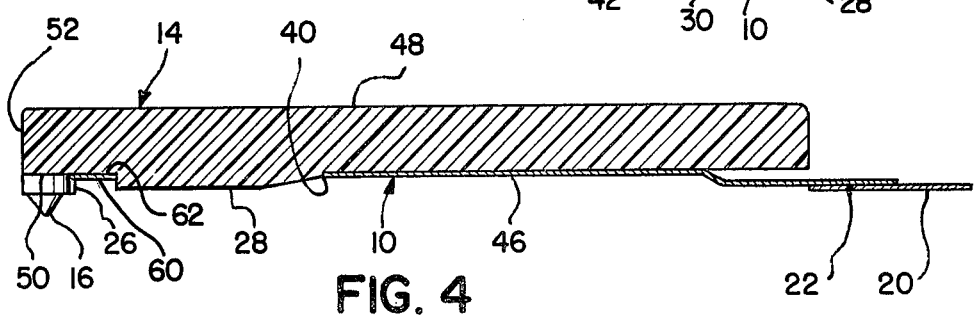

COMBINATION RECORDER PEN AND CLIP THEREFOR

BACKGROUND OF THE INVENTION

The present invention relates generally to the field of inking or pen devices suitable for use with industrial chart recorders and more particularly is directed to an improved apparatus for mounting the pen to the writing arm of a chart recorder.

The use of various types of clips for removably securing a recorder pen to a chart recorder writing arm is well known and various types of clip constructions have been employed by prior workers in the art. For example, clips and pens of interlocking construction of various configurations are illustrated in U.S. Pat. Nos. 4,052,713, 4,186,405 and 4,129,876. Typically, the prior art designs have included an elongate clip which can be secured to the chart recorder writing arm in known, secure manner, for example by spot welding. The interconnection between the recording pen itself and the clip has been designed by prior workers in the art to permit easy and quick interconnection between the parts to facilitate ready replacement of the marker pen and cartridge after the ink reservoir had been exhausted. The prior art marker pen and clip designs and constructions were particularly configured to removably secure the marker pen within the holder clip in an acurately predetermined position in a manner to prevent movement of the pen relative to the clip in either an axial or a transverse direction. The interconnection between the pen cartridge and the clip had to be sufficiently secure to prevent disassociation of the parts under all conditions of use, even under condtions of vibration or other disturbance which may be caused by the particular use of the instrument to which the pen was attached.

The present invention relates to an improvement over the known prior art devices whereby the interconnecting construction features respectively of the pen ink cartridge and the marker clip are so designed as to frictionally engage and disengage in a foolproof manner to facilitate easy, accurate, and extremely simple pen and cartridge replacement.

SUMMARY OF THE INVENTION

The present invention relates generally to the field of marker pens and clips therefore and more particularly is directed to a novel clip including elongated slots therein and to a cooperating marker pen including ridges in the cartridge thereof of size, position, and configuration to fit within the slots in the clip.

The marker pen clip of the present invention comprises generally an elongate body which terminates at one end in a suitable connection to a conventional writing arm such as the writing arm of a usual chart recorder device. The body terminates forwardly in a forward end or nose of configuration to engage projecting construction features provided in a known type of pen device or marker pen.

The clip of the present invention is particularly designed and adapted for use with a marker pen designed and produced by Dia-Nielsen U.S.A., Inc., Cinnaminson, N.J., and sold under the trademark "DIA-NIELSEN".

The clip body is forwardly provided with a pair of longitudinally extending, parallel, spaced slots of size and position to receive cooperating ridges which are provided in the marker pen cartridge. The forward portion of the clip body is additionally machined and bent or otherwise treated to provide a pair of longitudinally aligned, laterally positioned, spaced flanges or legs, which legs are intended to frictionally engage edge portions of the marker cartridge in a secure, but releasable manner.

In the preferred embodiment, the clip body is configured and designed to securely, but releasably, engage the marker pen in manner to prevent or discourage any longitudinal or transverse movement of the marker pen relative to the marker pen clip.

It is therefore an object of the present invention to provide an improved combination marker pen clip and marker pen of the type set forth.

It is another object of the present invention to provide a novel combination marker pen clip and marker pen including construction features wherein the association and disassociation of the marker pen with the clip can be quickly and easily effected.

It is another object of the present invention to provide a novel combination marker pen clip and marker pen wherein the precise positioning of the marker pen relative to the clip is self-orienting whereby the pen is always positioned in the exact predesigned relative location.

It is another object of the present invention to provide a novel combination marker pen clip and marker pen wherein the marker pen cartridge includes a pluralilty of projections and the marker pen clip is provided with corresponding slots or recesses whereby the parts may easily associated or disassociated in a speedy, foolproof interconnection.

It is another object of the present invention to provide a novel combination marker pen clip and marker pen that is simple in construction, inexpensive in manufacture and trouble free when in use.

Other objects and a fuller understanding of the invention will be had by referring to the following description and claims of a preferred embodiment thereof taken in conjunction with the accompanying drawings, wherein like reference characters refer to similar parts throughout the several views and in which:

BRIEF DESCRIPTION OF THE DRAWINGS

FIG. 1 is a top perspective view of the combination marker pen clip and marker pen in associated relation.

FIG. 2 is view similar to FIG. 1 showing the marker pen and the marker pen clip in exploded relationship.

FIG. 3 is bottom plan view of the marker pen applied to a marker clip.

FIG. 4 is a cross-sectional view taken along line 4—4 on FIG. 3, looking in the direction of the arrows.

FIG. 5 is an enlarged cross-sectional view taken along line 5—5 on FIG. 3, looking in the direction of the arrows.

FIG. 6 is a bottom perspective view of the combination marker pen clip and marker pen in associated relationship.

FIG. 7 is a view similar to FIG. 6 showing the marker pen and marker pen clip in exploded relationship.

DESCRIPTION OF THE PREFERRED EMBODIMENENT OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIGS. 1, 2, and 3 a combination marker pen clip 10 and a separate pen device or marker pen 12. It is a purpose of this invention to provide a construction whereby the pen device 12 can be easily and accurately associated with or disassembled from the clip 10. When the separate parts 10, 12 are assembled as in FIGS. 1 and 3, the interaction of the various interlocking components function to prevent longitudinal or transverse movements of the pen device relative to the clip.

Still referring to FIGS. 1-3, the pen device 12 comprises generally an ink or other marking fluid containing cartridge 14 and a stylus 16, the stylus being in fluid communication with the ink (not shown) in well known manner. As illustrated, the cartridge 14 is generally rectangular in planar configuration and includes a top surface 48, a bottom surface 50 and peripheral side walls 52 extending therebetween.

The stylus 16 projects downwardly from the bottom surface 50 for applying a continuous line upon a conventional chart or graph in well known manner. Immediately adjacent to and rearwardly of the stylus are provided a pair of downwardly extending projections or stablizers 24, 26 for engagement with the nose or forward end 44 of the clip 10 in the manner hereinafter more fully set forth. Rearwardly of and substantially in longitudinal alignment with the projections 24, 26 are provided a pair of spaced, longitudinally extending ridges 28, 30, which ridges serve to position and laterally restrain the association of the cartridge 12 upon the marker clip 10 as herein more fully discussed. Preferably, the ridges 28, 30 terminate rearwardly in sloping ends 58 to facilitate slip on assembly when the parts are associated.

Referring particularly now to FIGS. 2, 3 and 7, the clip 10 comprises generally an elongate body 46 which terminates rearwardly in a connection to the writing arm 20 in known manner, for example by employing a plurality of spot welds 22. The clip body terminates forwardly in a forward end or nose 44 which nose is configured to lie in a plane transverse to the longitudinal axis of the body 46. The forward portion of the body is punched, machined or otherwise worked to provide a pair of laterally spaced, longitudinally extending, parallel, elongated slots 40, 42 of size and configuration to receive therein the corresponding downwardly projecting ridges 28, 30 which depend from the bottom surface 50 of the cartridge 14. It is a feature of this invention that the cartridge ridges 28, 30 and the clip slots 40, 42 cooperate whereby the ridges 28, 30 seat within the respective slots 40, 42 when the parts are assembled in a manner to prevent either longitudinal or transverse relative movement between the cartridge 14 and the clip 10.

The forward portion of the clip 10 also includes a pair of laterally spaced, upwardly projecting flanges 32, 34, which flanges are formed at an acute angle with the plane of the clip body 46 to provide frictional engagement forces upon the longitudinal side walls 52 of the cartridge 14 upon assembly. See FIG. 5. Each flange 32, 34 terminates upwardly in a bent shoulder 36, 38, which shoulders bear against and frictionally engage the cartridge sidewall 52 to secure the parts together. As best seen in FIGS. 3 and 6, upon assembly of the parts, the forward end or nose 44 of the clip 10 abuts and positions against the projecting stabilizers 24, 26 which depend from the bottom surface 50 of the cartridge 14 to provide an easily assembled positioning arrangement whereby the position of the cartridge relative to the clip 10 is automatically and mechanically predetermined.

The interaction of the clip nose 44 with the stabilizers 24, 26 and the additional interaction of the clip elongated slots 40, 42 and the cartridge ridges 28, 30 serve to assure that there is no longitudinal or transverse relative movement between the cartridge 14 and the clip 46. The frictional engagement of the flanges 32, 34 against the cartridge sidewalls 52 serves further to prevent relative movement between the parts and to facilitate easy engagement and disengagement of a marker pen 12 from a marker pen clip 10 when pen replacement becomes necessary. Preferably the cartridge sidewall 52 is provided near the cartridge bottom with opposed transversely extending ledges 54, 56 to additionally frictionally engage the clip flanges 32, 34 respectively.

In order to use the combination marker pen clip and marker pen in accordance with the present invention, the clip 10 is preferably positioned with the flanges or tabs 32, 34 facing upwardly and the cartridge 14 and stylus 16 facing downwardly as illustrated in FIGS. 1 and 6. With the parts thus positioned, the clip 10 is applied upwardly against the bottom surface 50 of the cartridge 14 with the elongated slots 40, 42 in registry over the ridges 28, 30 so that the ridges 28, 30 project downwardly through the elongated slots 40, 42 as illustrated in FIG. 5. With the ridges and slots so positioned, the cartridge 14 can be pushed between the clip flanges 32, 34 so that the bent shoulders 36, 38 of the flanges will bear against and frictionally grip the cartridge sidewalls 52.

The clip 10 and marker pen 12 are pushed completely together by urging the shoulders 36, 38 upwardly along the cartridge sidewalls 52 until face to face contact is made. The interengagement between the flanges 32, 34 and the elongated slots 40, 42 will so position the nose or forward end 44 of the clip 10 to provide a two point engagement, that is the nose 44 will touch portions of the rearward peripheries of the spaced projections or stabilizers 24, 26. In a preferred embodiment, the ridges 28, 30 are rearwardly formed with sloping surfaces 58 to provide twin ramps leading from the cartridge bottom surface 50. The ramps 58 facilitate assembly by permitting the clip nose 44 to slide over the bottom surface of the cartridge 14, the ramps 58, and the ridges 28, 30 until the ridges snap into and lock into the corresponding clip slots 40, 42. When the parts are fully assembled, the bridge 60 which is defined immediately behind the clip nose 44 and forwardly of the slots 40, 42 will also snap into and lock within the planar area 62 which is defined between the cartridge ridges 28, 30 and stabilizers 24, 26.

Thus it is seen that the interaction and interlocking of the various flanges, ridges, slots, ledges, projections, bridge and nose of the clip will provide a complete, easily operated, interlocking system designed to prevent longitudinal, transverse or pivotal movement between the clip 10 and the pen device or marker pen 12.

While the interlocking construction features function well to prevent relative movement between the clip 10 and the pen device 12, it will be appreciated that the clip flanges 32, 34 define an upwardly open space to receive the cartridge 14 therewithin. Accordingly, the cartridge 14 can be relatively easily replaced by simply pulling the cartridge 14 upwardly away from the clip 10 with a force sufficient to overcome the frictional engagement between the clip flanges 32, 34 and the cartridge sidewalls 52.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A combination writing instrument comprising
   a holding clip, the holding clip terminating forwardly in a linear nose and rearwardly in connection end;
   a marking fluid containing cartridge in releasable engagement with the clip, the cartridge including a top, a bottom and sidewalls joining the top and bottom to define a hollow interior;
   clip engagement means projecting from the cartridge to engage portions of the holding clip, the clip engagement means extending longitudinally of the clip and comprising at least one longitudinally oriented ridge, the ridge projecting downwardly below the bottom of the cartridge;
   slot means provided in the holding clip to receive and encircle the ridge of the clip engagement means, the slot means comprising at least one elongated slot,
   the slot being longitudinally oriented and of size, position and configuration to receive the ridge in releasable engagement therewithin; and
   a stylus in fluid communication with the cartridge interior,
   whereby the marking fluid can flow to the stylus for marking purposes when the writing instrument is in use and whereby relative longitudinal movement between the cartridge and the clip is prevented.

2. The instrument of claim 1 wherein the slot is positioned rearwardly of the nose and forwardly of the connection end and wherein a bridge is defined between the nose and the slot.

3. The instrument of claim 1 wherein the clip engagement means further comprises at least one projection positioned to project toward the clip and wherein a forward portion of the clip is in contact with the one projection when the ridge is received within the slot.

4. A combination writing instrument comprising
   a holding clip;
   a marking fluid containing cartridge in releasable engagement with the clip, the cartridge including a top, a bottom and sidewalls joining the top and bottom to define a hollow interior;
   clip engagement means extending longitudinally of the clip and projecting from the cartridge to engage portions of the holding clip, the clip engagement means comprising a pair of parallel, spaced, longitudinally extending ridges;
   slot means provided in the holding clip to receive portions of the clip engagement means,
   the slot means comprising a pair of parallel, spaced, longitudinally positioned slots, the slots being of size, spacing and configuration to receive the ridges in engagement therewithin, whereby relative longitudinal movement between the cartridge and the clip is prevented; and
   a stylus in fluid communication with the cartridge interior whereby the marking fluid can flow to the stylus for marking purposes when the writing instrument is in use.

5. The instrument of claim 4 wherein the clip is planar and is provided with a pair of transversely opposed spring flanges, the flanges defining acute angles with the plane of the clip, portions of the flanges being spaced apart a distance that is less than the width of the cartridge, whereby the flanges frictionally engage the cartridge sidewalls.

6. The instrument of claim 5 wherein a pair of opposed ledges project laterally from the cartridge sidewalls and wherein the flanges of the clip overfit the ledges in a releasable engagement.

7. The instrument of claim 4 wherein the clip engagement means comprises at least one projection extending from the cartridge bottom forwardly of the ridges.

8. The instrument of claim 4 wherein the clip engagement means further comprises at least one projection positioned to project toward the clip and wherein a forward portion of the clip is in contact with the one projection when another portion of the clip engagement means is received within the slot means.

9. A marker pen clip comprising
   an elongated flat body, the body terminating rearwardly in a writing arm connection and forwardly in a nose;
   at least one longitudinally extending elongated slot being positioned in the body intermediate the nose and the arm connection, the slot beginning rearwardly of the nose to define a planar bridge between the nose and the slot; and
   a pair of laterally spaced spring flanges extending at acute angles from the plane of the body,
   the flanges being in lateral registry with at least a portion of the elongated slot, the flanges not being in lateral registry with the said bridge.

10. The clip of claim 9 wherein the body comprises a longitudinal axis and wherein the nose terminates in a straight edge positioned at right angles to the longitudinal axis, the edge being linear and uninterrupted.

11. The clip of claim 9 wherein the flanges laterally register over the entire slot, the flanges extending from a forward portion of the clip in transverse alignment with the forward terminus of the slot to a rearward portion of the clip that is rearward of the rearward terminus of the slot.

12. A writing device for releasable connection to a clip comprising
    a marking fluid containing cartridge comprising a top, a bottom and sidewalls joining the top and bottom to define a hollow interior to receive the marking fluid;
    clip engagement means projecting downwardly from the bottom of the cartridge to engage portions of a cartridge holding clip,
    the clip engagement means comprising a pair of longitudinally extending ridges and at least one projection, the projection being positioned on the cartridge bottom forwardly of the ridge, each ridge being spaced an equal distance from the longitudinal axis of the cartridge; and
    a stylus in fluid communication with the cartridge interior whereby the marking fluid can flow from the interior to the stylus for marking purposes.

13. The device of claim 12 wherein the clip engagement means further comprises a pair of laterally spaced, transversely projecting ledges extending from the cartridge sidewall, the ledges being in planar alignment with the cartridge bottom.

14. The device of claim 12 wherein the ridges extend between a forward end and a rearward end and wherein the rearward end of each of the ridges slopes to the cartridge bottom in an inclined ramp.

* * * * *